US011908118B2

(12) United States Patent
Xu et al.

(10) Patent No.: US 11,908,118 B2
(45) Date of Patent: Feb. 20, 2024

(54) VISUAL MODEL FOR IMAGE ANALYSIS OF MATERIAL CHARACTERIZATION AND ANALYSIS METHOD THEREOF

(71) Applicant: CITIC Dicastal Co., Ltd., Qinhuangdao (CN)

(72) Inventors: Zuo Xu, Qinhuangdao (CN); Yuancheng Cao, Wuhan (CN); Wuxin Sha, Wuhan (CN); Zhihua Zhu, Qinhuangdao (CN); Hanqi Wu, Qinhuangdao (CN); Fanpeng Cheng, Wuhan (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 330 days.

(21) Appl. No.: 17/387,955

(22) Filed: Jul. 28, 2021

(65) Prior Publication Data
US 2022/0301139 A1    Sep. 22, 2022

(30) Foreign Application Priority Data
Mar. 19, 2021  (CN) .......................... 202110305450.1

(51) Int. Cl.
G06T 7/00       (2017.01)
G06T 7/62       (2017.01)
G06V 20/69      (2022.01)
G06V 10/30      (2022.01)
G06N 3/08       (2023.01)
G06T 7/20       (2017.01)
G06F 18/214     (2023.01)
G06F 18/21      (2023.01)

(52) U.S. Cl.
CPC .......... *G06T 7/0002* (2013.01); *G06F 18/214* (2023.01); *G06F 18/217* (2023.01); *G06N 3/08* (2013.01); *G06T 7/20* (2013.01); *G06T 7/62* (2017.01); *G06V 10/30* (2022.01); *G06V 20/695* (2022.01); *G06T 2207/10056* (2013.01); *G06T 2207/20081* (2013.01); *G06T 2207/20084* (2013.01); *G06T 2207/30241* (2013.01)

(58) Field of Classification Search
None
See application file for complete search history.

(56) References Cited

U.S. PATENT DOCUMENTS

| 7,672,369 | B2 * | 3/2010 | Garakani | .................. G06T 7/20 |
| | | | | 375/240.01 |
| 2019/0384047 | A1 * | 12/2019 | Johnson | .................. G06V 10/50 |
| 2020/0124516 | A1 * | 4/2020 | Vidal | .......................... G06T 7/20 |
| 2021/0063376 | A1 * | 3/2021 | Li | .............................. G06T 7/62 |
| 2021/0117729 | A1 * | 4/2021 | Bharti | .................. G06T 7/0012 |

* cited by examiner

*Primary Examiner* — Leon Viet Q Nguyen
(74) *Attorney, Agent, or Firm* — IPro, PLLC

(57) ABSTRACT

The present disclosure provides a visual model for image analysis of material characterization and analysis method thereof. By collecting and labeling big data of microscopic images, the present disclosure establishes an image data set of material characterization; and uses this data set for high-throughput deep learning, establishes a neural network model and dynamic statistical model based on deep learning, to identify and locate atomic or lattice defects, and automatically mark the lattice spacing, obtain the classification and statistics of the true shape of the microscopic particles of the material, quantitatively analyze the tissue dynamics of the material.

12 Claims, 2 Drawing Sheets

US 11,908,118 B2

VISUAL MODEL FOR IMAGE ANALYSIS OF MATERIAL CHARACTERIZATION AND ANALYSIS METHOD THEREOF

TECHNICAL FIELD

The present disclosure relates to the technical field of image analysis of material characterization, in particular to a visual model used for image analysis of material characterization and an analysis method thereof.

BACKGROUND

The material composition determines the microstructure, and the microstructure determines the macro physical and chemical properties. In recent years, the latest advances in high-end characterization techniques such as atomic force microscopy (AFM), scanning transmission electron microscopy (STEM), and cryo-electron microscopy (Cryo-SEM) have enabled people to observe the microscopic evolution of materials with atomic-level spatial resolution. These methods coupling with high-speed camera technology further improves the time resolution of the characterization technology, which allows direct observation of atomic-level dynamic phenomena. The physical and chemical phenomena studied by in-situ electron microscopy have been very extensive, including defect evolution, dislocation migration, phase transformation, etc., and can even observe transient phase changes under the extreme shock conditions of multi-field coupling of electromagnetic heating.

However, the success of material science in characterization requires not only exploratory research and instrument improvement, but also the timely and effective processing of the large amount of data generated by these instruments to infer specific information such as dynamics and thermodynamics describing the microstructure of materials. Although the ability to collect material data with high temporal and spatial resolution is constantly improving, there is little information about process dynamics and thermodynamics inferred from these high-end characterization images. The inherent limitations of manual analysis in amount and speed obstruct the deep use of high-end characterization technology. Therefore, it is urgent to develop a visual model for images of material characterization to replace manual analysis of images of material characterization.

The patent with publication number CN112132785A provides a transmission electron microscope image recognition and analysis method and system for two-dimensional materials. This patent uses the TEM image with a pixel larger than the set threshold to determine the center of the atom, and uses the multi-ellipse fitting method of multiple contour lines to determine the position of the atom based on the TEM image and the atomic radius, and then connects the atoms, obtaining the atomic structure diagram, and uses this to determine the morphology, angle and bond length of the two-dimensional materials. However, the method provided by this patent can only be used to analyze the transmission electron microscopy images of two-dimensional materials, and the scope of application is relatively narrow; and the recognition of atomic positions requires a known atomic radius to be carried out, and it is difficult to automatically perform automatic identification for unknown transmission electron microscopy images, and practical applications are limited.

In view of this, it is necessary to design an improved visual model for image analysis of material characterization and analysis method thereof to automatically analyze various types of micro characterization images at different scales to realize the detection and tracking of microscopic defects of materials, and further extract the microstructure reaction mechanism from these observations to solve the above problems.

SUMMARY

In view of the above-mentioned shortcomings of the prior art, the purpose of the present disclosure is to provide a visual model for image analysis of material characterization and analysis method thereof. By collecting and labeling big data of microscopic images, establish an image data set of material characterization; and use this data set for high-throughput deep learning, establish a neural network model and dynamic statistical model based on deep learning, identify and locate atomic or lattice defects, and automatically mark the lattice spacing, obtain the classification and statistics of the true shape of the microscopic particles of the material, quantitatively analyze the tissue dynamics of the material, and realize the automatic high-throughput analysis of the material characterization images.

In order to achieve the above objects, the present disclosure provides an analysis method for material characterization images, which comprises the following steps:

Collect and mark samples of material characterization images to establish an image data set of material characterization;

Establish an initial neural network model, and use the image data set of material characterization to train it to obtain a neural network model based on deep learning; and establish a dynamic statistical model;

Input the characterization image of the material to be analyzed into the deep learning-based neural network model and the dynamic statistical model, and identify and analyze the output results, complete atom identification and interplanar spacing annotation, microscopic particle morphology statistics, and tracking of microstructure motion trajectory.

As a further improvement of the present disclosure, the image data set of material characterization comprises a first data set composed of first material characterization images marked with atomic species and crystal structure parameters, and a second data set composed of second material characterization images marked with edges and center points of microscopic particles and a third data set composed of third material characterization images marked with microstructure features.

As a further improvement of the present disclosure, the deep learning-based neural network model comprises a first neural network model trained on the first data set and a second neural network model trained on the second data set.

As a further improvement of the present disclosure, the training of the first neural network model comprises the following steps:

S1. Input the pixel matrix of any one of the first material characterization images in the first data set into the initial neural network model, and after the pixel values are sequentially calculated through the convolutional layers, the pooling layers, the fully connected layers, and the fully convolutional layers, the output pixel matrix is obtained;

S2. Compare the output pixel matrix obtained in step S1 with the pixel matrix of the first material characterization image used in step S1, and calculate a loss function value;

S3. Repeat steps S1 to S2 and input the pixel matrices of the other first material characterization images in the first data set into the initial neural network model to obtain corresponding loss function value related to each of the first material characterization image; then calculate the loss gradient according to each loss function value, and use the chain method to adjust the network parameters in the initial neural network model to obtain the adjusted neural network model;

S4. Replace the initial neural network model with the adjusted neural network model, and repeat steps S1 to S3 to adjust the network parameters until the obtained loss function value is within a predetermined threshold range, thus finishing the training of the first neural network model.

As a further improvement of the present disclosure, the output result of the first neural network model comprises the segmented atomic image, the lattice image, and the identified atomic species and crystal structure parameters. The crystal structure parameters comprise interplanar spacing, cell parameters and crystal orientation; when recognizing and analyzing the output result of the first neural network model, it also comprises judging the types of atomic defects and lattice defects.

As a further improvement of the present disclosure, the second material characterization image in the second data set is obtained according to the following method:

After performing noise reduction pretreatment on the material characterization image containing microscopic particles, the microscopic particles in the image are separated from the background, and the edges and center points of each of the microscopic particles are manually labeled;

When the microscopic particles overlap or are adjacent to each other, multiple image transformation methods are used to separate and extract them.

As a further improvement of the present disclosure, the second neural network model is used to identify and separate the edges and centers of the microscopic particles, and output the morphological characteristics of the microscopic particles; the morphological characteristics comprise equivalent diameter, area, perimeter and curvature; when recognizing and analyzing the output result of the second neural network model, it also comprises establishing an association database between the morphological characteristics and the macroscopic properties of the material.

As a further improvement of the present disclosure, the microstructure features marked in the third material characterization image in the third data set comprise the contour and category of the microstructure; the dynamic statistical model is used to deal with the said third data set or the output data of the said second neural network model, identify and track the position and destination of the microstructure.

As a further improvement of the present disclosure, the output result of the dynamic statistical model comprises the motion trajectory of the microstructure; an unsupervised method is used to identify and analyze the output result of the dynamic statistical model for identifying the material structure of different energy states, and the tissue dynamics of the material is quantitatively analyzed according to the motion trajectory, so as to calculate and derive the macroscopic characteristics of the material.

In order to achieve the above objects, the present disclosure also provides a visual model for image analysis of material characterization, including a first neural network model used to complete atom identification and interplanar spacing annotation, and a second neural network model used to count microscopic particle morphology and a dynamic statistical model used to track the motion trajectory of microstructures.

The beneficial effects of the present disclosure are:

(1) The present disclosure establishes an image data set of material characterization by collecting and labeling big data of microscopic images; and uses this data set for high-throughput deep learning, and establishes a neural network model and dynamic statistical model based on deep learning. On this basis, the present disclosure can use the neural network model and the dynamic statistical model to process the material characterization image, thereby identify and locate the atom or lattice defects in the material characterization image, and automatically mark the lattice spacing, obtain the classification and statistics of the true shape of the microscopic particles of the material, quantitatively analyze the tissue dynamics of the material, and realize the automatic high-throughput analysis of the material characterization images. In addition, through further identification and analysis of the output results of the neural network model and dynamic statistical model, it is also possible to explore the corresponding relationship between the macroscopic properties and the microscopic morphology, and then quantitatively calculate and even derive the macroscopic properties, and analyze the conversion probability between phases, to provide deeper insights into the dynamics and physical and chemical reactions of microscopic materials, so as to better control the macroscopic properties of materials, and promote the theoretical development and technological progress of materials science.

(2) The present disclosure trains the neural network model by using the data marked with the atom types and crystal structure parameters, and continuously adjusts the network parameters according to the loss function value, so that the first neural network obtained after training has higher accuracy and can accurately compare the small differences between different gray levels, accurately identify and segment the atoms and crystal lattices in the material characterization image, and automatically complete the calculation of the interplanar spacing and other crystal structure parameters in combination with the ruler information, and then identify and classify existing defects in the atoms and the crystal lattice.

(3) The present disclosure marks the edges and center points of the microscopic particles in the material characterization image, and then uses this type of data set to train the second neural network model, and continuously adjusts the network parameters according to the separation and recognition errors of the microscopic particles, so that it can accurately capture the particle edge and center position. At the same time, the present disclosure accurately separates the overlapping or adjacent microscopic particles by separately using a variety of image transformation methods, which further improves the accuracy of the model when recognizing the appearance of the microscopic particles. On this basis, the present disclosure can analyze the parameters of the separated microscopic particles, like equivalent diameter, area, perimeter, curvature and so on, and calculate the effective size statistically, and then establish a relational database between the effective size and the macroscopic properties of the material.

(4) The present disclosure processes the segmented dynamic material characterization image or the data output by the second neural network model by establishing a dynamic statistical model, and can accurately identify each microstructure according to the characteristics of each microstructure, and track its position and whereabouts, to form a time-space trajectory diagram of the microstructure in order to analyze the motion trajectory of a single particle or cluster. On this basis, the present disclosure can also quantitatively analyze the tissue dynamics of the material according to the movement trajectory of each microstructure, and then calculate or even derive the macroscopic properties such as diffusion coefficient, electrical conductivity, thermal conductivity and capacity, which provide deeper insights into the dynamics and physical and chemical reactions of microscopic materials.

DETAILED DESCRIPTION OF THE EMBODIMENTS

Figure 1:
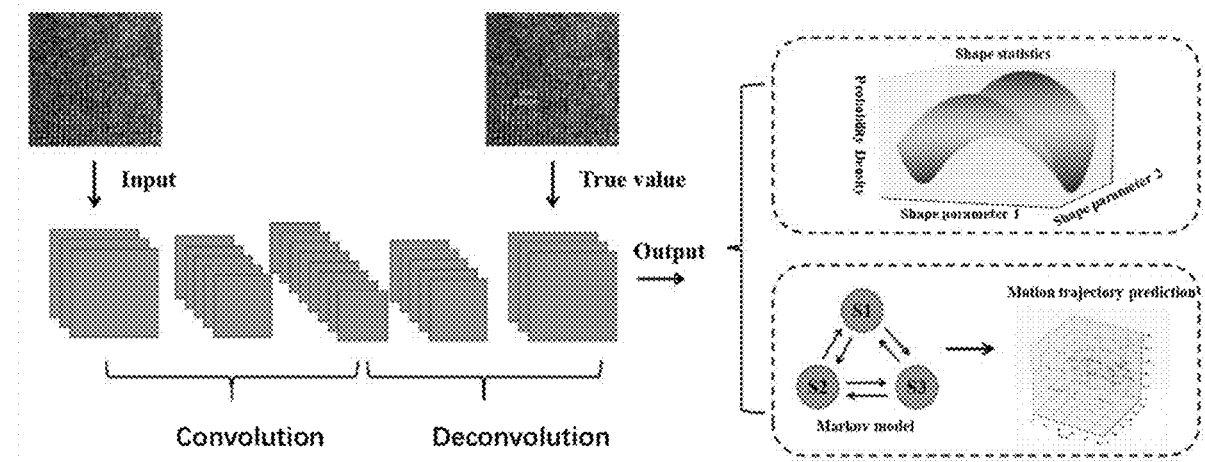
FIG. 1 is a schematic diagram of the main flow of the analysis method for images of material characterization provided by the present disclosure.
Figure 2:
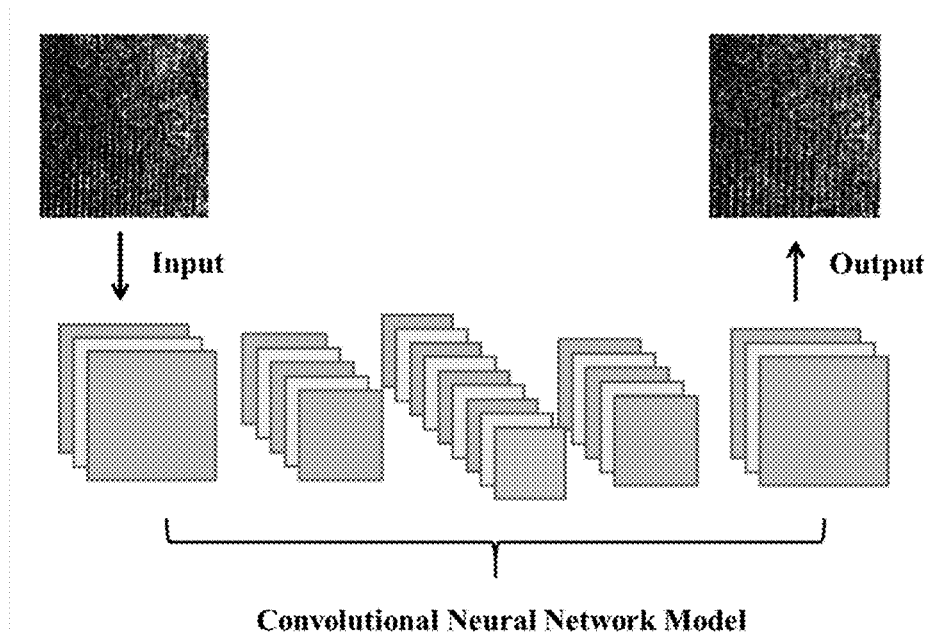
FIG. 2 is a schematic diagram of the image processing flow when the first neural network model in the analysis method provided by the present disclosure performs atom recognition.
Figure 3:
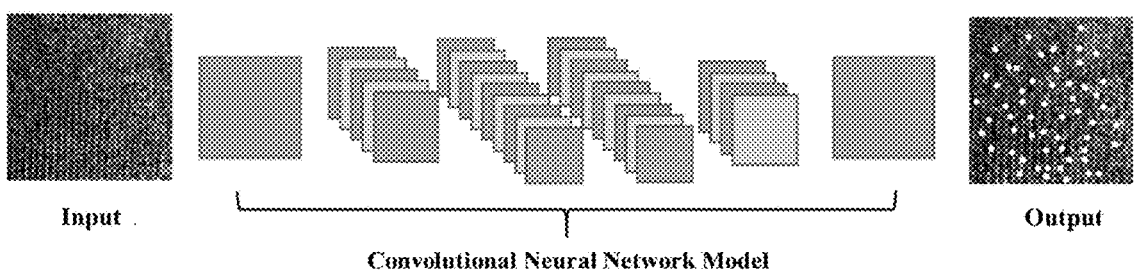
FIG. 3 is a schematic diagram of the processing flow of identifying the microscopic particle morphology by the second neural network model in the analysis method provided by the present disclosure.
Figure 4:
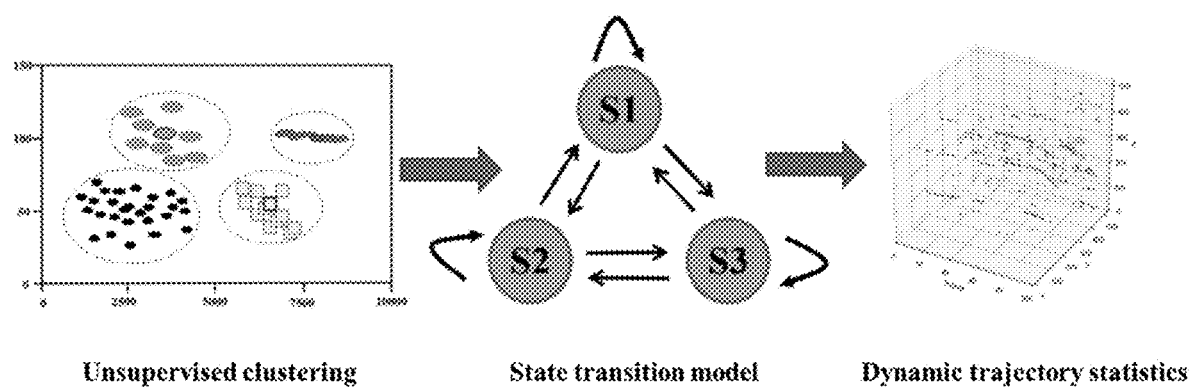
FIG. 4 is a schematic diagram of the process of identifying and tracking the motion trajectory of the microstructure in the dynamic statistical model in the analysis method provided by the present disclosure.

The present disclosure provides a method for analyzing images of material characterization. The main flow diagram is shown in FIG. 1, and specifically comprises the following steps:

Establish an initial neural network model, and use the image data set of material characterization to train it to obtain a neural network model based on deep learning; and establish a dynamic statistical model;

Input the characterization image of the material to be analyzed into the deep learning-based neural network model and the dynamic statistical model, and identify and analyze the output results, complete atom identification and interplanar spacing annotation, microscopic particle morphology statistics, and tracking of microstructure motion trajectory.

In an embodiment of the present disclosure, the image data set of material characterization comprises a first data set composed of first material characterization images marked with atomic species and crystal structure parameters, and a second data set composed of second material characterization images marked with edges and center points of microscopic particles and a third data set composed of third material characterization images marked with microstructure features.

Wherein, the deep learning-based neural network model comprises a first neural network model trained on the first data set and a second neural network model trained on the second data set. Based on the different training data sets used in each neural network model, the corresponding functions of the first neural network model and the second neural network model are: atom recognition and interplanar spacing labeling, and microscopic particle morphology statistics. At the same time, the established dynamic model is used to track and infer the motion trajectory of the microstructure.

In order to realize the functions of atom identification and interplanar spacing marking, in an embodiment of the present disclosure, the following methods are specifically adopted:

Firstly, the atomic types and crystal structure parameters of different materials in the samples of material characterization image are manually labeled to establish the first data set.

Then, establish an initial neural network model, initialize the network parameters randomly, and then use the first data set to perform parameter training on the neural network model, which specifically comprises the following steps:

S1. Input the pixel matrix of any one of the first material characterization images in the first data set into the initial neural network model, and after the pixel values are sequentially calculated through the convolutional layers, the pooling layers, the fully connected layers, and the fully convolutional layers, the output pixel matrix is obtained;

S2. Compare the output pixel matrix obtained in step S1 with the pixel matrix of the first material characterization image used in step S1, and calculate a loss function value;

S3. Repeat steps S1 to S2 and input the pixel matrices of the other first material characterization images in the first data set into the initial neural network model to obtain corresponding loss function value related to each of the first material characterization image; then calculate the loss gradient according to each loss function value, and use the chain method to adjust the network parameters in the initial neural network model to obtain the adjusted neural network model;

S4. Replace the initial neural network model with the adjusted neural network model, and repeat steps S1 to S3 to adjust the network parameters until the obtained loss function value is within a predetermined threshold range, thus finishing the training of the first neural network model.

Through the above-mentioned parameter training process, the first neural network model obtained after training can have high accuracy, and can accurately compare the small differences between different gray levels, accurately identify and segment the atoms and crystal lattices in the material characterization image, and automatically complete the calculation of the interplanar spacing and other crystal structure parameters in combination with the ruler information. Based on this, the output result of the first neural network model comprises the segmented atomic image, the lattice image, and the identified atomic species and crystal structure parameters, and the crystal structure parameters comprise interplanar spacing, cell parameters, and crystal orientation.

When identifying and analyzing the output result of the first neural network model, the generalization ability of the network can also be used to judge the types of atomic defects and lattice defects. Specifically, because the existence of the defect location will destroy the periodic arrangement of the crystal lattice, it is preliminarily determined that it is only necessary to use frequency domain methods such as Fourier Transform to capture the low-frequency signal and mark it as a defect, and then map it to the real picture as a training sample. Then design an appropriate loss function, and gradually optimize the network model parameters, so that it can obtain higher accuracy from the preliminary marking, so as to realize the classification and positioning of microscopic defects such as gaps or grain boundaries.

In order to realize the statistical function of microscopic particle morphology, in an embodiment of the present disclosure, taking nanoparticles as an example, the following methods are specifically adopted:

As a further improvement of the present disclosure, the second material characterization image in the second data set is obtained according to the following method:

Firstly, after performing noise reduction pretreatment on the material characterization image containing nanoparticles, select the appropriate pixel gray threshold, and then binarize the image, preliminarily defining that the pixels below the threshold are all particles; find out a number of representative typical nano-particle pictures as the comparison benchmark, the preliminary defined particles and typical particles are compared, the similarity is compared according to the image moments, and the calculation of different roundness is performed, and then weights are assigned according to the calculation results to establish a comprehensive evaluation index. Then, the particles and the background are marked in different colors according to the index calculation result, the nanoparticles in the image are separated from the background, and the edges and center points of each of the microscopic particles are manually labeled to establish a second data set.

Then, use the second data set to train the initial neural network in a manner similar to the first neural network model, and use the error of the separation and recognition of the nanoparticles as the loss function to obtain the second neural network model. The second neural network model can not only perform parallel analysis on the material characterization image to be processed together with the first neural network model, but also can further process the output result of the first neural network model, so as to realize the statistics of microscopic particles.

In the above process, for overlapping or adjacent nanoparticles, a variety of image transformation methods need to be used for separation. In an embodiment of the present disclosure, firstly, the atom position determined in the output result of the first neural network model is used as a rough boundary contour, and the average distance or equivalent diameter between particles or atoms is counted as a judgment threshold. When the particle center or the atomic center distance is less than the threshold, it can be recognized as overlapping or adjacent. These nanoparticles can perform position transformation and spatial translation through a variety of affine transformation methods such as long-distance transformation and watershed method to achieve the purpose of separation. Finally, the individual nanoparticle images whose center distance is still smaller than the judgment threshold after transformation are excluded from the data set.

Through the above method, the second neural network model can effectively improve the recognition efficiency and accuracy of the edge and center of the nanoparticle, so as to accurately calculate and output the characteristics of the nanoparticle such as equivalent diameter, area, perimeter, and curvature for statistical calculations of effective size. When recognizing and analyzing the output result of the second neural network model, the acquired morphological characteristics can be correlated with the macroscopic properties of the corresponding material to establish an association database between the morphological characteristics and the macroscopic properties of the material.

In order to realize the function of tracking and inferring the motion trajectory of the microstructure, in an embodiment of the present disclosure, the following methods are specifically adopted:

First, use the dynamic image collected by the high-speed atomic force microscope as the material characterization image sample, and use software such as labelme, keypoint, coco-annotator, etc. to draw out the outline of the specific microstructure on each frame of the microscopic image, and match the corresponding name. Microstructure features are annotated in implement pixel-level such as contours and categories to establish a third data set. Lay a data foundation for subsequent semantic segmentation and instance segmentation.

Then, a dynamic statistical model is established to process the third data set or the output result of the second neural network model. The dynamic statistical model can accurately identify and track the position and whereabouts of each microstructure in the dynamic process according to the characteristics of each microstructure, so as to output the motion trajectory of the microstructure. Among them, the microstructure can be a single particle or a cluster.

Specifically, in an embodiment of the present disclosure, a suitable unsupervised algorithm is selected, such as Markov model, Bayesian inference method, Gaussian mixture model, etc., to establish a dynamic statistical model, and deal with the output result of the second neural network model, comparing and analyzing the parameters in the dynamic process such as the organizational structure, spatial position, movement speed, etc., and classify a large number of microscopic entities into a small number of microstructures with different energy states. Then reestablish the complete time-space trajectory diagram of the microstructure, separate and analyze the motion trajectory of the microstructure, and deeply study the evolution mechanism of the particle behavior in the microstructure.

More specifically, in an embodiment of the present disclosure, a Markov model is adopted as the analysis method. Firstly, identify the massive microstructure and defect features in the microphotographs, conduct a comparative analysis of the parameters such as organizational structure, spatial position, movement speed, topographic features, etc. in the dynamic process, and classify a large number of microscopic entities into several categories of microstructures with different energy states. Then count the migration speed of each microstructure category, count the probability of mutual transformation between different structure categories or retain the original state, and establish the Markov state transition matrix. Then, combined with the energy difference between different structural categories, summarize the laws of the dynamics process in the system, and calculate the macroscopic properties corresponding to these statistical values, such as diffusion coefficient, ion conductivity, ion capacity, light transmission coefficient, etc., to realize the deep insight analysis of microscopic images.

Through the above method, the dynamic statistical model can track and infer the motion trajectory of the microstructure, so as to quantitatively analyze the tissue dynamics of the material, and then calculate or even derive the macroscopic properties such as diffusion coefficient, electrical conductivity, thermal conductivity, and capacity, to provide more in-depth insights into the microscopic dynamics and physical and chemical reactions of materials.

Based on the above-mentioned image analysis of material characterization method, the present disclosure establish a visual model for image analysis of material characterization including the above-mentioned first neural network model, second neural network model and dynamic statistical model. Based on this visual model, the present disclosure can realize the following functions:

(1) Automatically locate single atoms or lattice defects, realize the judgment of crystal orientation and automatic mark of lattice spacing;

(2) Classify and count the true morphology of the microscopic particles of the material, realize high-throughput microscopic image analysis, and explore the corresponding relationship between macroscopic properties and microscopic morphology, so as to accurately control the macroscopic properties of materials;

(3) Track and infer the trajectory of atomic clusters, quantitatively analyze the tissue dynamics of materials, and then calculate and even derive macroscopic properties such as diffusion coefficient, electrical conductivity, thermal conductivity, and capacity.

In summary, the present disclosure provides a visual model for image analysis of material characterization and an analysis method thereof. The present disclosure establishes an image data set of material characterization by collecting and labeling big data of microscopic images; and uses this data set for high-throughput deep learning, and establishes a neural network model and dynamic statistical model based on deep learning, to identify and locate the atom or lattice defects, and automatically mark the lattice spacing, obtain the classification and statistics of the true shape of the microscopic particles of the material, quantitatively analyze the tissue dynamics of the material. Through the above method, the present disclosure can realize the automatic high-throughput analysis of the material characterization images, and calculate and derive the macroscopic properties of the material according to the microscopic morphology and micro dynamics of the material, which is conducive to promoting the theoretical development and technological progress in materials science, and has high practical application value.

What is claimed is:

1. A method for analyzing images of material characterization, wherein it comprises the following steps:
    collect and mark samples of material characterization images to establish an image data set of material characterization, wherein the said image data set of material characterization comprises a first data set composed of first material characterization images marked with atomic species and crystal structure parameters, and a second data set composed of second material characterization images marked with edges and center points of microscopic particles and a third data set composed of third material characterization images marked with microstructure features;
    establish an initial neural network model, and use the image data set of material characterization to train it to obtain a neural network model based on deep learning; and establish a dynamic statistical model;
    input the characterization image of the material to be analyzed into the deep learning-based neural network model, and identify and analyze the output results, complete atom identification and interplanar spacing annotation, microscopic particle morphology statistics; and
    input the third data set or output data of the deep learning-based neural network model into the dynamic statistical model to complete tracking of microstructure motion trajectory.

2. The method for analyzing images of material characterization according to claim 1, wherein the said deep learning-based neural network model comprises a first neural network model trained on the said first data set and a second neural network model trained on the said second data set.

3. The method for analyzing images of material characterization according to claim 2, wherein the training of the said first neural network model comprises the following steps:
    S1. Input a pixel matrix of any one of the first material characterization images in the said first data set into the initial neural network model, and after the pixel values are sequentially calculated through the convolutional layers, the pooling layers, the fully connected layers, and the fully convolutional layers, an output pixel matrix is obtained;
    S2. Compare the said output pixel matrix obtained in step S1 with the pixel matrix of the said first material characterization image used in step S1, and calculate a loss function value;
    S3. Repeat steps S1 to S2 and input the pixel matrices of the said other first material characterization images in the said first data set into the said initial neural network model to obtain corresponding loss function value related to each of the said first material characterization image; then calculate the loss gradient according to each loss function value, and use a chain method to adjust network parameters in the said initial neural network model to obtain an adjusted neural network model;
    S4. Replace the said initial neural network model with the said adjusted neural network model, and repeat steps S1 to S3 to adjust the said network parameters until the obtained loss function value is within a predetermined threshold range, thus finishing the training of the first neural network model.

4. The method for analyzing images of material characterization according to claim 2, wherein the output result of the said first neural network model comprises a segmented atomic image, a lattice image, and the identified atomic species and crystal structure parameters, the said crystal structure parameters comprise interplanar spacing, cell parameters and crystal orientation; when recognizing and analyzing the output result of the said first neural network model, it also comprises judging the types of atomic defects and lattice defects.

5. The method for analyzing images of material characterization according to claim 3, wherein the output result of the said first neural network model comprises a segmented atomic image, a lattice image, and the identified atomic species and crystal structure parameters, the said crystal structure parameters comprise interplanar spacing, cell parameters and crystal orientation; when recognizing and analyzing the output result of the said first neural network model, it also comprises judging the types of atomic defects and lattice defects.

6. The method for analyzing images of material characterization according to claim 2, wherein the said second material characterization image in the said second data set is obtained according to the following method:
    After performing noise reduction pretreatment on the material characterization image containing microscopic particles, the said microscopic particles in the image are separated from the background, and the edges and center points of each of the said microscopic particles are manually labeled;
    When the said microscopic particles overlap or are adjacent to each other, multiple image transformation methods are used to separate and extract them.

7. The method for analyzing images of material characterization according to claim 4, wherein the said second material characterization image in the said second data set is obtained according to the following method:

After performing noise reduction pretreatment on the material characterization image containing microscopic particles, the said microscopic particles in the image are separated from the background, and the edges and center points of each of the said microscopic particles are manually labeled;

When the said microscopic particles overlap or are adjacent to each other, multiple image transformation methods are used to separate and extract them.

8. The method for analyzing images of material characterization according to claim 6, wherein the said second neural network model is used to identify and separate the edges and centers of the said microscopic particles, and output the said morphological characteristics of the microscopic particles; the said morphological characteristics comprise equivalent diameter, area, perimeter and curvature; when recognizing and analyzing the output result of the said second neural network model, it also comprises establishing an association database between the said morphological characteristics and the macroscopic properties of the material.

9. The method for analyzing images of material characterization according to claim 7, wherein the said second neural network model is used to identify and separate the edges and centers of the said microscopic particles, and output the said morphological characteristics of the microscopic particles; the said morphological characteristics comprise equivalent diameter, area, perimeter and curvature; when recognizing and analyzing the output result of the said second neural network model, it also comprises establishing an association database between the said morphological characteristics and the macroscopic properties of the material.

10. The method for analyzing images of material characterization according to claim 2, wherein the said microstructure features marked in the said third material characterization image in the said third data set comprise the contour and category of the microstructure; the said dynamic statistical model is used to deal with the said third data set or the output data of the said second neural network model, identify and track the position and destination of the microstructure.

11. The method for analyzing images of material characterization according to claim 1, wherein the output result of the said dynamic statistical model comprises the motion trajectory of the microstructure; an unsupervised method is used to identify and analyze the output result of the said dynamic statistical model for identifying the material structure of different energy states, and the tissue dynamics of the material is quantitatively analyzed according to the said motion trajectory, so as to calculate and derive the macroscopic characteristics of the material.

12. A visual model for image analysis of material characterization, wherein it comprises:

a first neural network model used to complete atom identification and interplanar spacing annotation, the first neural network model is trained on a first data set, the first data set is composed of first material characterization images marked with atomic species and crystal structure parameters, a second neural network model used to count microscopic particle morphology, the second neural network model is trained on a second data set, the second data set is composed of second material characterization images marked with edges and center points of microscopic particles; and a dynamic statistical model used to deal with the said third data set or the output data of the said second neural network model to track the motion trajectory of microstructures, the third data set composed of third material characterization images marked with microstructure features.

* * * * *